United States Patent [19]

Chang et al.

[11] Patent Number: 5,019,696
[45] Date of Patent: May 28, 1991

[54] SYSTEM AND METHOD FOR READING DATA RECORD STRIPES ON DATA CARDS

[75] Inventors: Karl Chang, Honolulu; William R. Pape, III, Papaaloa; Victor J. Crosetti, Jr., Honolulu; Lance S. Nakamura, Pearl City; Daniel B. C. Leong; Robert K. L. Loui, both of Honolulu, all of Hi.

[73] Assignee: Verifone, Inc., Redwood City, Calif.

[21] Appl. No.: 276,914

[22] Filed: Nov. 28, 1988

Related U.S. Application Data

[60] Division of Ser. No. 85,287, Aug. 10, 1987, Pat. No. 4,788,420, which is a continuation of Ser. No. 770,725, Aug. 28, 1985, abandoned.

[51] Int. Cl.$^5$ .............................................. G06K 7/00
[52] U.S. Cl. ..................................... 235/436; 235/449; 235/482; 360/2
[58] Field of Search ...................... 235/436, 449, 482; 360/2; 379/91

[56] References Cited

U.S. PATENT DOCUMENTS

| | | | |
|---|---|---|---|
| 4,239,151 | 12/1980 | Enser et al. | 235/449 X |
| 4,304,992 | 12/1981 | Kobayashi et al. | 360/2 |
| 4,587,379 | 5/1986 | Masuda | 379/91 |
| 4,626,670 | 12/1986 | Miller | 235/482 |
| 4,745,265 | 5/1988 | Douno et al. | 360/2 X |
| 4,752,837 | 6/1988 | Deland | 235/449 X |
| 4,788,420 | 11/1988 | Chang et al. | 235/483 |

Primary Examiner—David Trafton
Attorney, Agent, or Firm—Lowell C. Bergstedt

[57] ABSTRACT

A system for reading a data record stripe on a credit card which includes an injection molded case including a card guide slot integrally molded into the case near one side thereof and a read head window integrally formed in one sidewall of the card guide slot. A data read head assembly having a read head on a front face thereof is mounted in the read head window and is spring biased toward the wall of the card slot opposite the read head window. A circuit arrangement is coupled to the read head assembly for detecting data signals on a card passing through the slot and converting the data signals to a substantially square wave signal pattern representing binary signal data in the form of positive and negative signal transitions of the square wave signal. A microcomputer circuit coupled to the circuit arrangement is programmed to detect positive and negative signal transitions, to register in individual memory locations the time interval between successive signal transitions, and to reconstruct the binary signal data from the pattern of the registered time intervals.

7 Claims, 8 Drawing Sheets

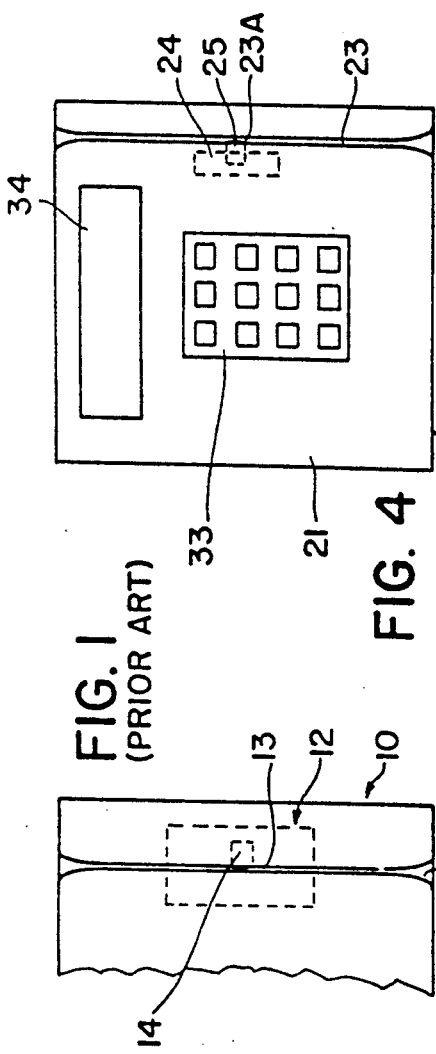
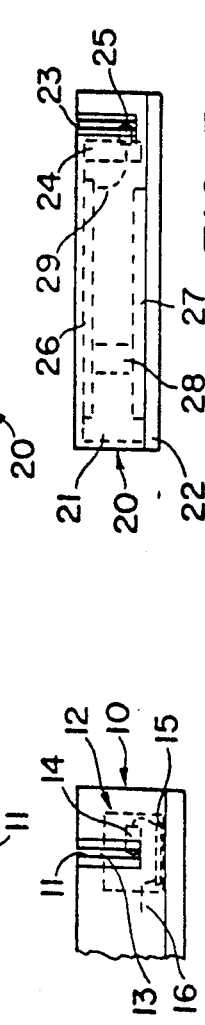
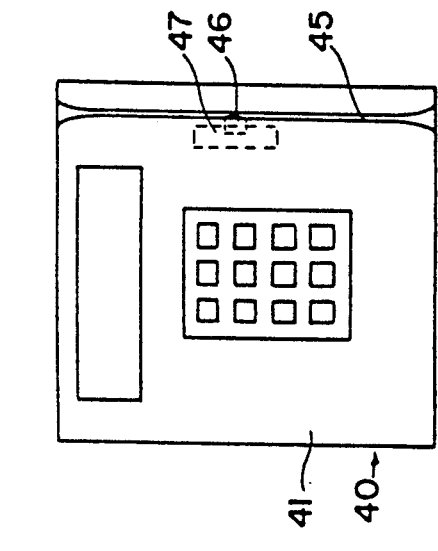
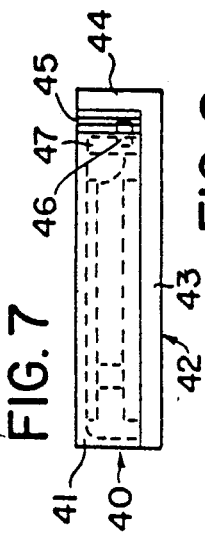
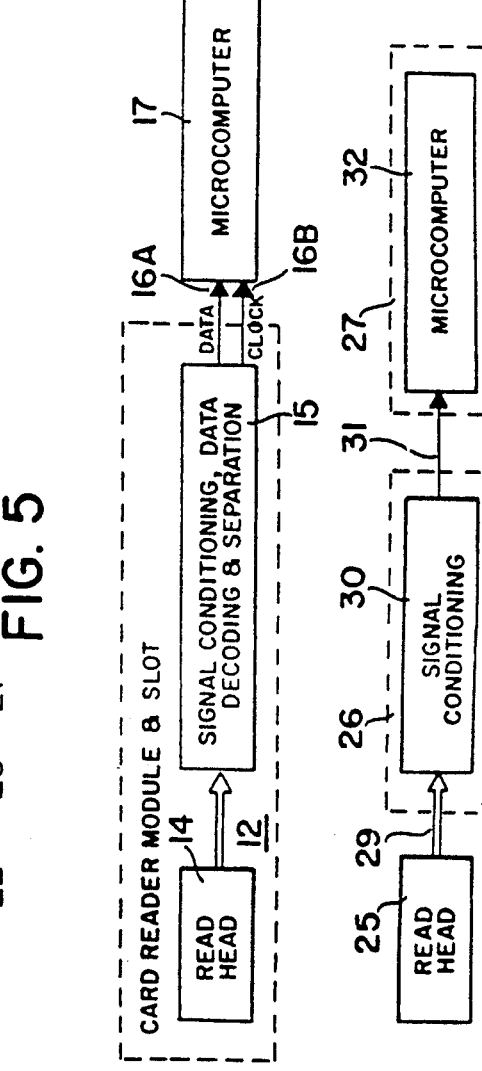

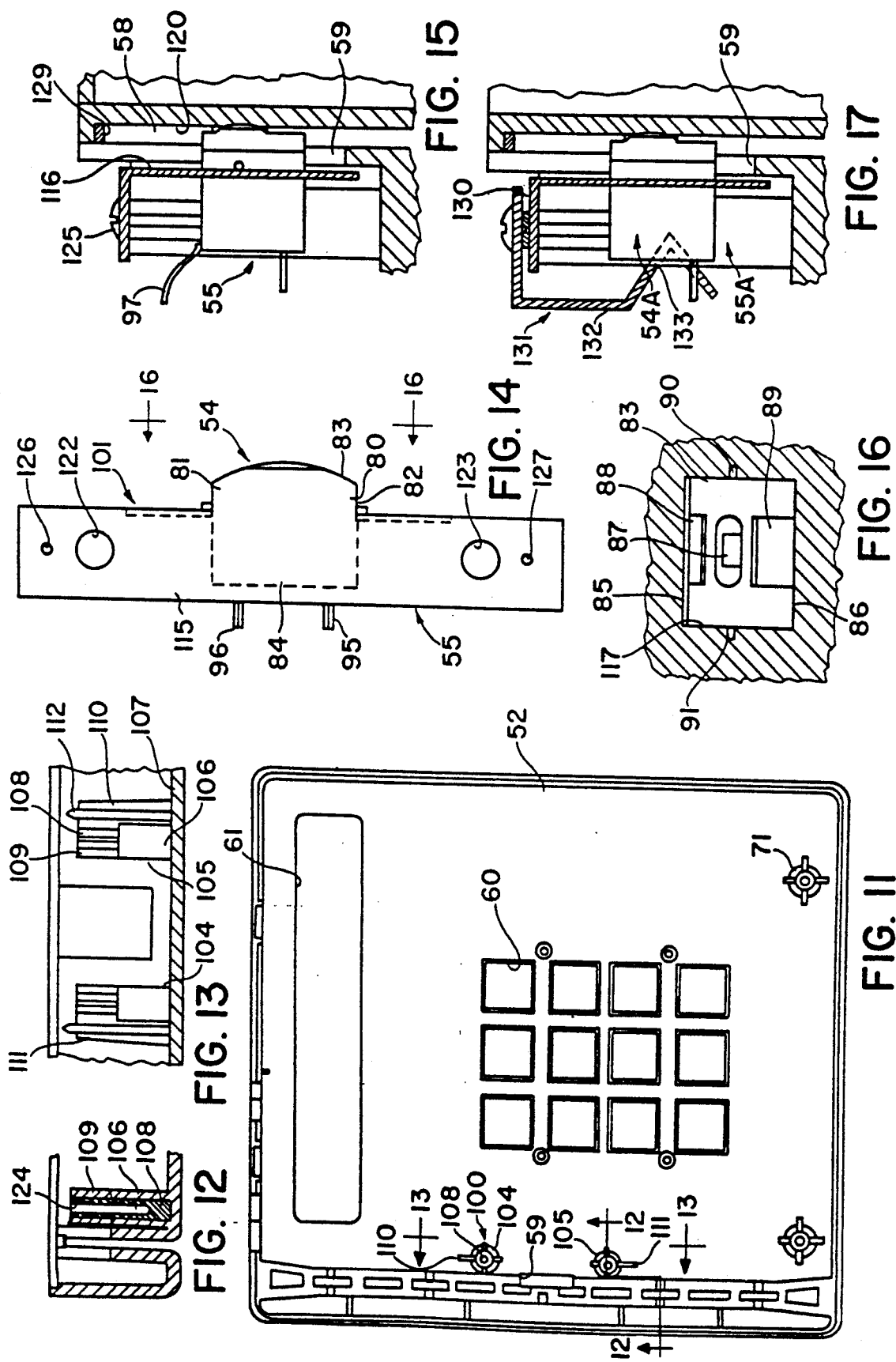

1 0 1 1 0 1 1 0 0

1 1 1 1 1 1 1 1 ... 0 1 1 0 1
⎿──INITIAL CLOCK BITS──⎿ START SENTINEL

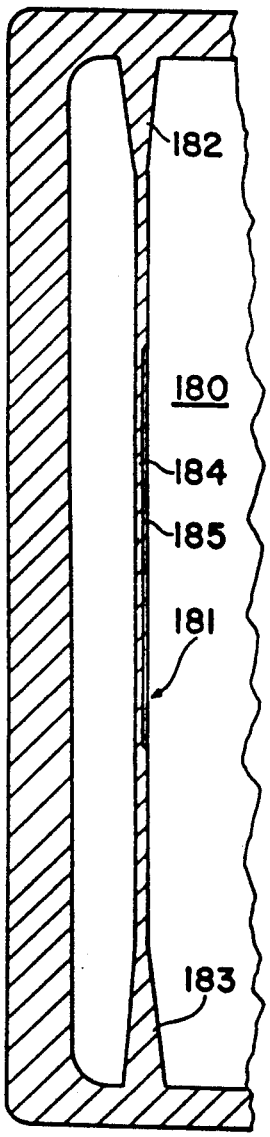
FIG. 27
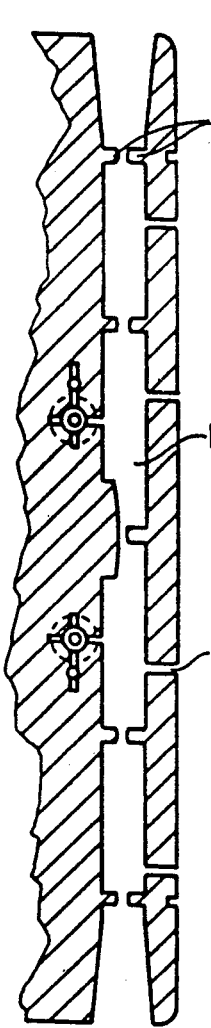
FIG. 28
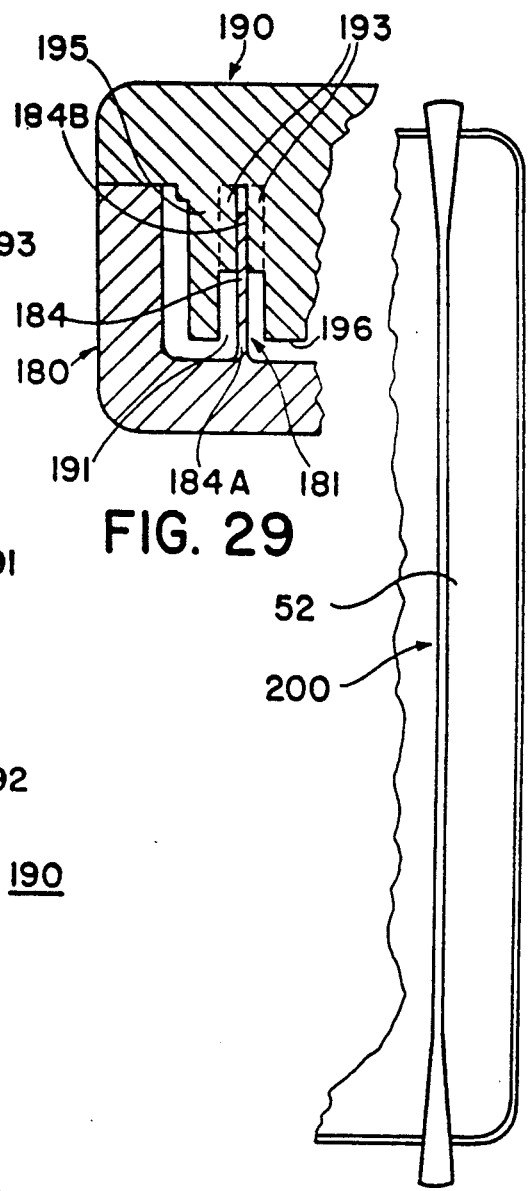
FIG. 29
FIG. 30

SYSTEM AND METHOD FOR READING DATA RECORD STRIPES ON DATA CARDS

CROSS REFERENCE TO RELATED APPLICATIONS

This application is a divisional of my copending U.S. application Ser. No. 07/0852,287 filed Aug. 10, 1987 (now U.S. Pat. No. 4,788,420), which is a continuation of copending U.S. application Ser. No. 06/770,725, filed Aug. 28, 1985 (now abandoned).

FIELD OF THE INVENTION

This invention relates generally to systems and methods for reading data record stripes on data cards. More particularly, this invention relates to systems and methods for reading magnetic data tracks on credit cards, to systems and methods for decoding signals from a magnetic pickup head scanning a card stripe into stored data bytes, to methods of constructing a credit card verification terminal, and to methods for injection molding a card reader case with an integral card slot.

BACKGROUND AND PRIOR ART

Substantial performance improvements and cost reductions in integrated circuits for the microcomputer and telecommunications fields have been made in recent years. These improvements in cost/performance have made it economically attractive to mass produce certain system applications of this technology at affordable prices. One such area of application is the point of sale terminal for credit verification of a credit cardholder wishing to make a purchase.

Until recently, retail establishments, such as stores and restaurants, could not afford to take the time and effort to verify credit for purchases of goods or services having a small dollar value. Credit verification involved making a phone call to a credit verification office, waiting for some lesser or greater time period to be connected to a person at the office, and then verbally giving the credit card number and awaiting the authorization code for the transaction. Consequently, only credit card purchases which totalled more than a certain amount were subject to credit verification and these transactions often tied up sales or checkout clerks for substantial periods of time and made customers unhappy about the wait.

The problems of credit verification resulted in losses to the retail merchants from unauthorized credit card usage and less than enthusiastic reception of credit card usage for large purchases in busy stores. Within the past few years, point of sale terminals tied on a telecommunications basis to a central computer for credit verification have begun to make a large impact on retail merchants. Initially these terminals were very large, quite expensive, and thus not very affordable to the average merchant. Some of the terminals required many of the same steps to be performed that manual credit verification required, i.e. the manual placing of a phone call to the computer and manual entry of the credit card number and the other transaction data.

Gradually the performance of the prior art terminals increased as more microcomputer power and telecommunications capability with autodialing were introduced into the terminals and as card stripe reader capability was provided. All of these improvements made use of the terminal more automatic and completing the credit verification task more time efficient. Still the size of the prior art terminals was large, making it difficult to find room on crowded checkout and cash register counters for another piece of equipment. Also the units were still quite expensive, limiting the size of retail establishment which could cost justify the terminal and the on-line telecommunications costs associated with it. Clearly, the limitations of prior art terminals impedes more wide spread acceptance of the point of sale, on line credit verification terminals and improvements are needed to make this technology cost effective for, and attractive to, the large population of small retail establishments.

OBJECTS OF THE INVENTION

It is the principal object of this invention to provide an improved system for reading data stripes on data cards such as credit cards.

It is another object of this invention to provide a system for reading data stripes on data cards which has improved cost/performance characteristics.

It is another object of this invention to provide an improved point of sale credit verification terminal.

It is another object of this invention to provide a lower cost technology for the manufacture of credit verification terminals.

It is another object of this invention to provide a credit verification terminal with full features in a case having a smaller desk footprint.

FEATURES AND ADVANTAGES OF THE INVENTION

One aspect of this invention features a system for reading a data record stripe on a data card which incorporates an injection molded case itself defining an entire card guide near one side thereof and a read head window in one side wall of the card guide. A data read head assembly having a read head on a front face thereof is provided together with a mounting means for mounting the data read head assembly in the read head window with the read head projecting through the read head window into the card guide slot at an accurate position relative to the position of the data record stripe on a data card passing through the card guide.

In a preferred embodiment the injection molded case comprises a bottom portion and a cover portion, and the card guide, including both side walls and a bottom wall, is integrally formed in the cover portion. The read head assembly preferably includes a housing having a pair of side walls having exterior projections formed thereon substantially in alignment with the center of the read head. The bracket mounting means comprises a pair of screw mounting posts positioned adjacent opposite sides of the read head window. The bracket arrangement comprises an integral spring and bracket element having a bracket portion extending parallel to the card guide slot with an aperture therein for receiving the read head housing in a substantially close fitting relation. This bracket portion cooperates with the projections on the housing to spring bias the read head housing toward the opposite wall of the card guide slot while providing a gimbal mounting which permits slight rotation of the read head housing about an axis defined by the projections.

Another aspect of this invention features a system of the general type mentioned above in which a signal conditioning circuit arrangement is coupled to the read head assembly for detecting data signals on the magnetic data stripe and converting the data signals to a substantially square wave signal pattern representing binary signal data in the form of the timing pattern of positive and negative signal transitions of the square wave signal. A microcomputer circuit arrangement is coupled to the preconditioning circuit arrangement. The microcomputer is programmed to operate in a first, real time period to detect the positive and negative signal transitions in the square wave signal and to register in individual memory locations a value corresponding to the time interval between successive signal transitions. The microcomputer is further programmed to operate in a second, postprocessing time period to reconstruct the binary signal data from the pattern of the registered time intervals.

These features of the invention provides equal or better performance at substantially lower cost to manufacture. Prior art systems employ a case in which only a portion of the card guide is defined in the case itself. A main portion of the card guide is provided by a separate card reader module which fastens to the case and includes not only a read head assembly but also signal reading and decoding circuits which perform card data decoding functions. The cost of this separate module, together with the labor cost for mounting it in the case, contributes substantially to the high cost of prior art terminals.

The features of this invention are advantageously employed in a credit verification terminal which includes an injection molded case formed to have a desk footprint approximately the same as a standard desk telephone. The case comprises an injection molded cover and an injection molded base together forming an enclosure. The card guide is defined with right, left, and bottom walls positioned entirely within the cover and closely adjacent the right hand edge thereof. The cover further defines a two-dimensional array of keypad apertures in a central region of the top wall thereof and a display element window in an upper region of the top wall. The read head window is defined in a central portion of the left side wall of the card guide. The mounting means includes a bracket mounting means integrally molded into the cover adjacent the read head window.

The terminal preferably includes a pair of circuit boards each having a configuration substantially matching the interior of the cover. A first one of the boards is mounted to the underside of the top wall of the cover and has mounted thereon a multi-element display device received within the display element window and a keypad assembly having keys thereon received within the keypad apertures. A second one of the boards is mounted adjacent the base and includes microcomputer and modem circuitry thereon. Each of the boards has a multipin connector mounted thereon and a ribbon cable is mounted between the connectors to provide power and signal connections between the boards.

This terminal packaging technique provides the advantage of very low cost manufacturing of a full feature system with a small desk footprint. The cost of the individual components is substantially reduced over prior art systems and the labor to assemble the entire terminal is lowered by the simplicity of the few components and modules incorporated in the system.

Another aspect of this invention features a method for reading and decoding data from a magnetic data stripe on a credit card. The first step involves detecting the magnetic data signal pattern stored on the data stripe. This is followed by converting the detected data signal pattern in real time to a sequence of stored timing values representing the data signal pattern. The sequence of stored timing values is then decoded into a sequence of stored binary data values based on the pattern of the stored timing values.

Preferably the converting step involves converting the detected signal pattern into a square wave signal having an integral clock and wherein a ONE bit value is defined by a single transition of the square wave signal during a clock interval and a ZERO bit value is defined by two transitions of the square wave signal during a clock interval.

The time interval between each signal transition of the square wave signal is measured in real time. Also in real time, a data value representing each of the time intervals is stored as the measurement is completed.

The preferred approach to the decoding step performed in a post processing period is to first determine a clock period value from the stored data values. Then a stored data value is converted into a test number value comprising the stored data value plus a preselected fraction of the stored data value. Next, the test number value is compared with the clock period value to decode the associated stored data value to a ONE bit if the test number value is greater than the clock period value or a ZERO bit if the test number value is not greater than the clock period value. The decoded bit value is then stored and the steps of converting, comparing, and storing are performed for the next stored data value if the decoded bit value is ONE. Those steps are skipped for the next stored data value if the decoded bit value is ZERO since two stored data values are produced for each zero bit and double decoding would introduce redundant bit values which would have to be stripped out later.

The method of this invention combines the advantages of reliable, real time detection of card data signals with maximum utilization of the resources of an onboard microcomputer both in real time measurement of the timing signal pattern from the card and in post processing of the data signals for accurate decoding of the card data bits. Use of computer and computer program resources instead of the dedicated circuitry used in prior art systems eliminates a substantial portion of the cost of the terminal and achieves superior performance.

Another aspect of this invention features a method for injection molding a card reader case with an integrally molded card slot. The method includes forming a female mold section defining the outer front and side wall configuration of the case and including a thin knife blade element extending from one end wall to the other and partially through the mold section to define the outer bottom and side walls of the card slot. Another step involves forming a male mold section having one portion defining the inner front and side wall configuration of the case and a second portion defining the inner side and bottom walls of the card slot, including defining the configuration of a read head window in one of the side walls of the card slot. This second portion of the male mold section includes a plurality of narrow buttress sections regularly spaced from one end to the other on opposite sides of the second portion. These buttress sections are adapted to contact opposite edges of the knife blade when the male mold section is mated with the female mold section.

The process then involves bringing the male and female mold sections together in mating relationship and injecting plastic material into void regions within the mated mold sections. The buttress portions defined on the male mold section support the knife blade during the injection process to prevent distortion thereof and thereby to produce a well formed straight card slot in the molded case with narrow fenestrations corresponding to the buttress sections of the male mold section.

Preferably the male and female mold sections are ejected after the injected plastic material has partially cured, the molded case is ejected from the mold, and a conforming insert is placed into the card slot while the case is curing to final hardness in air to preclude distortion of the card slot.

This method of injection molding of the case provides a high quality and reproducibility of the integral card slot in the case. This feature is critical to the achievement of low cost manufacturing of a high quality system. Other approaches to implementing the general feature of this invention of a card slot defined entirely by the molded case and not by a separate card reader module can be utilized. One such other approach involves molding one wall of the card slot in one piece of the case and molding the bottom wall and the other side wall from another piece of the case such that the full card slot is defined when the two pieces or sections are mounted together. This is less advantageous and more difficult to control from a quality standpoint but still provides the main advantages of the invention.

Other objects, features and advantages of this invention, together with a more complete understanding of those discussed above, will be learned from a consideration of the following detailed description in conjunction with the accompanying drawings.

BRIEF DESCRIPTION OF DRAWINGS

FIGS. 1-3 are schematic drawings depicting prior art card reader technology.

FIGS. 4-8 are schematic drawing depicting card reader features in accordance with this invention.

FIG. 11 is a back plan view of a cover of a case for a terminal incorporating the features of this invention.

FIG. 12 is a partial section view taken along the lines 12—12 in FIG. 11.

FIG. 13 is a partial view taken along the lines 13—13 in FIG. 11.

FIG. 14 is a to plan view of a read head mounting arrangement in accordance with this invention.

FIG. 15 is a section view of a read head mounting arrangement in accordance with this invention.

FIG. 16 is a partial view of a read head mounting arrangement in accordance with this invention.

FIG. 17 is a section view of an alternative embodiment of a read head mounting arrangement in accordance with this invention.

FIGS. 27-30 are drawings illustrating features of an injection molding process in accordance with this invention.

DETAILED DESCRIPTION OF EMBODIMENTS

Figure 9:
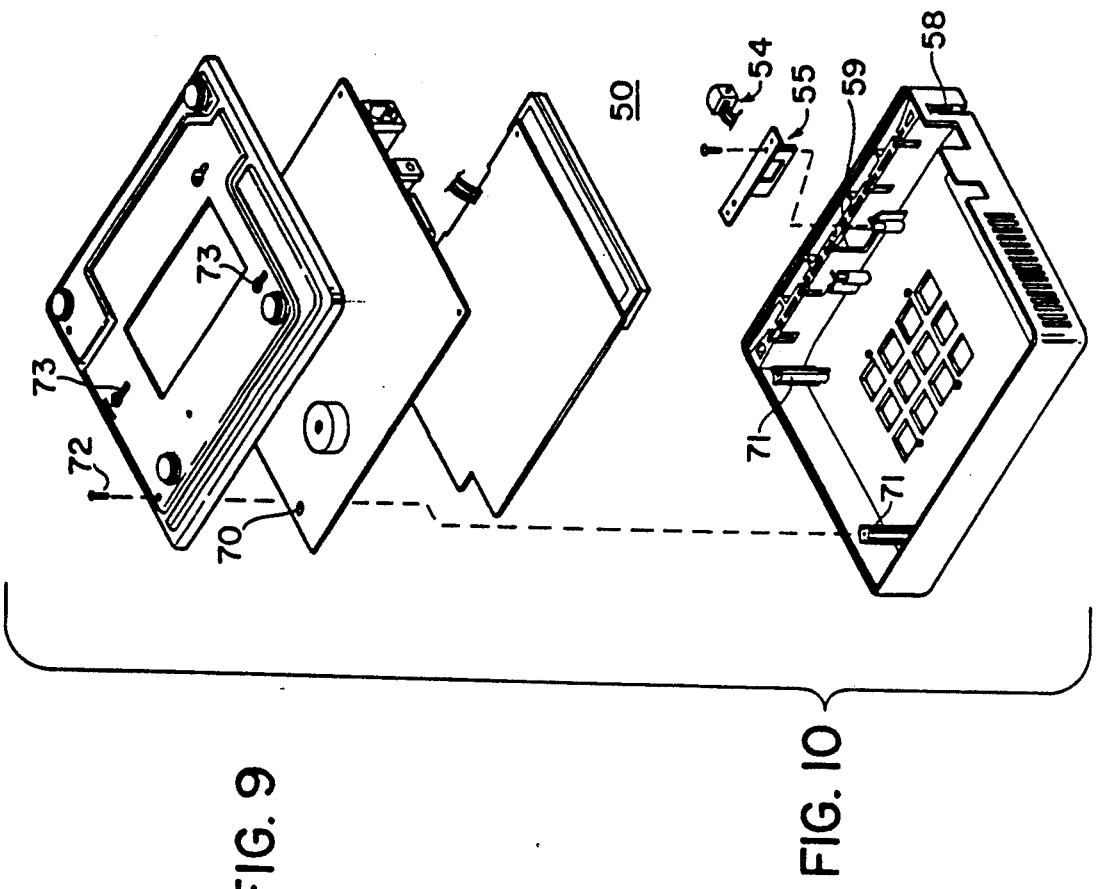
FIGS. 9 and 10 are exploded isometric views of the main elements of a point of sale card reader terminal incorporating features of this invention.

Referring now to FIGS. 1-3, the general structure and operation of a card reader used in prior art point of sale credit verification terminals will be described. The card reader case 10 defines a partial card slot 11 and in the central portion of the card slot a card reader module 12 having its own integral slot 13 is mounted. A magnetic read head assembly 14 is provided in the card reader module. The output of the read head assembly is coupled to a circuit 15 which performs signal conditioning and data decoding and clock separation on the output signals from the read head 14. The output signals on output leads 16A and 16B are data bytes in ASCII format and clock signals which are received by microcomputer 17 for processing the card data.

As discussed above, the use of a separate card reader module with its own card slot adds substantially to the cost of manufacture of the credit verification terminal. These costs are due to the cost of the module with internal circuitry and to the assembly cost for mounting the separate module in the case.

FIGS. 4, 5 and 6 illustrate generally the structure and operation of a preferred embodiment of a data card reading system and method in accordance with this invention, which has particularly advantageous application in a point of sale credit verification terminal. The terminal includes a case 20 which comprises a cover 21 and a base portion 22. Preferably, the cover portion 21 defines an integral card slot 23 which extends along the right hand side of the cover 21 close to the right hand edge. Cover portion 21 defines the entire right and left sidewalls of card slot 23 as well as the bottom wall thereof. A read head window designated 23A is defined in the left side wall of the card slot 23.

Adjacent the read head window 23A is formed a mounting arrangement 24 for mounting a magnetic read head assembly 25 in an appropriate vertical position in the read head window 23A. The details of this read head mounting arrangement are depicted in other drawing figures and will be described below. Preferably, the read head mounting arrangement 24 includes positioning and locating elements which are integrally formed with cover 21.

Output signals from read head 25 are coupled via signal lines 29 to a circuit board 26. On circuit board 26, signal conditioning circuits 30 are provided to convert theses output signals to a square wave signal. Circuit board 26 also has mounted thereon a keypad 33 and a multi-element display 34. Appropriate apertures are defined in the top wall of the cover 21 for the keypad 33 and the display 34.

A second circuit board 27 includes microcomputer circuitry 32 and is coupled by way of a cable, shown schematically in FIG. 5 and designated 28, to the circuit board 26. As shown in FIG. 6, the square wave output signal 31 from signal conditioning circuit 30 is fed to the microcomputer 32 for data decoding and other processing under software control. The details of this operation will be discussed below.

The main advantage of the system shown in FIG. 4 is the cost reduction achieved by defining the entire card slot 23 in the cover 21 of the case. A simple mounting arrangement is provided for the magnetic read head assembly, resulting in low manufacturing cost due to ease of assembly, simplicity and low component cost. Simple and inexpensive signal conditioning circuitry 30 is provided, with the main workhorse tasks of data decoding and processing being performed by microcomputer 32 under program control. Since the microcomputer is provided for performing other tasks and can be programmed in accordance with this invention to perform data decoding and processing tasks in a simple and effective manner, substantial savings in eliminating dedicated circuit costs are achieved.

The central feature of this invention, namely that of having the case of the defining the entire card slot in combination with a simplified mounting arrangement for a low cost magnetic read head can be achieved in other embodiments, such as the one shown in FIGS. 7 and 8. In this embodiment, the case 40 comprises a cover 41 and a base portion 42. Base portion 42 includes a bottom portion 43 and a section 44 which defines the bottom and right side walls of the card slot 45. The left side wall of card slot 45 is defined by the cover 41. Mounting arrangement 47 for read head assembly 46 may be the same as in the embodiment shown in FIGS. 4 and 5. All other aspects of the overall system are essentially the same as the embodiment of FIGS. 4 and 5 and need not be described here. The use of two separate portions of the case 40 to define the entire card slot 45 may make it more difficult to maintain tolerance on the configuration of the card slot 45 and may not provide the same level of manufacturing cost advantage as is provided by the preferred embodiment.

It should be apparent that there are also other approaches to forming the overall case of the terminal such that the case defines the entire card slot in accordance with the principles of this invention. For example, separate left and right portions of the case adjacent the card slot could be combined with a totally separate base section, each of which separately defines left, right and bottom walls of the card slot. Each additional piece involved in defining the card slot will of course add additional manufacturing cost and complexity to assembly of the case. However, all of these approaches will provide some substantial improvement over the prior art systems.

Figure 10:
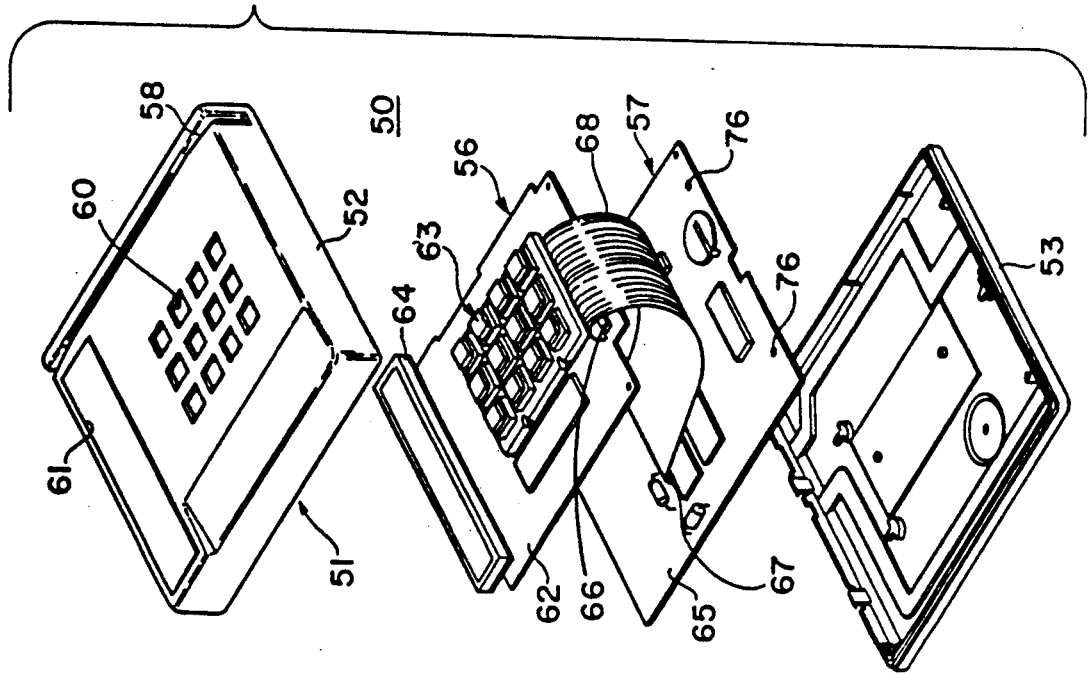

FIGS. 9 and 10 illustrate with exploded isometric views the simplified assembly of components of a credit verification terminal in accordance with this invention. The terminal 50 includes a case generally designated 51 which comprises a cover 52 and a base 53. The other modules of the terminal 50 are two circuit board assemblies 56 and 57, read head assembly 54, and read head mounting arrangement 55 which mounts the read head assembly 54 in the cover 52. These two circuit boards and other modules are mounted within the enclosure defined by the cover 52 and base 53.

Cover 52 itself defines an entire card slot 58 and a read head window 59 in the left side wall thereof. The details of the card slot 58, the read head window 59 and other aspects of the mounting arrangement for the read head assembly will be described below in conjunction with enlarged and section views.

Cover 52 also defines the two-dimensional array of apertures 60 in a central portion of the top of the cover and a rectangular display aperture 61 which may be covered with a transparent plastic sheet. Printed circuit module 56 includes a circuit board 62, and a keypad assembly 63 with individual keys which are received in the apertures 60 in the cover 52. The multi-element display 64 is mounted on the circuit board 62 and is received in the display aperture 61 of the cover 52.

Printed circuit module 57 includes a circuit board 65 with a number of microcomputer and other circuit components formed thereon. A connector 66 is provided on board assembly 56 and a connector 67 is provided on board assembly 57, with ribbon cable 68 coupled therebetween to provide power supply and data and control signal communication between the two board assemblies.

Board assembly 56 is mounted to the underside of the top wall of cover 52 using any convenient fastening arrangement. Board assembly 57 has a bottom section with mounting apertures 70 therein which cooperate with the mounting studs 71 and the mounting screws 72 to hold board assembly 57 in place adjacent the base 53. A variety of other mounting arrangements could readily be provided for this overall assembly.

The terminal 50 can readily be manufactured to have a desk footprint about the size of a standard desk telephone, for example with dimensions of 14×15.2 centimeters. The position of the card slot 58 at the right side of the case 51 provides a convenient card wiping location for persons using the terminal, most of whom will be right handed. Mounting slots 73 in the base 53 provide capability for mounting the terminal 50 on a wall if desired.

Because of the simplicity of the mounting arrangement 55 with the read head assembly 54 located to the left of the integral card slot 58, the portion of the cover 52 between the card slot 58 and the right edgewall of the case can be made very small compared to prior art systems. It will be appreciated that the terminal assembly of this invention features high packing density of the components to achieve the small terminal size, but combines this high packing density with ease of assembly to provide overall low cost of manufacture. The cover 52 and base 53 are injection molded ABS plastic pieces. In particular, cover 52 may be formed utilizing a particular method of injection molding of its features which comprises one aspect of this invention and is described in detail below.

Referring now to FIGS. 11-16 the details of read head assembly 54 and mounting arrangement 55 for read head assembly 54 will be described. Initially a preferred embodiment of read head assembly 54 and mounting arrangement 55 will be described, followed by a description of a modified version depicted in FIG. 17.

Read head assembly 54 includes a housing 80 having side walls 81 and 82, front and back walls 83 and 84, and top and bottom walls 85 and 86. Front wall 83 includes a magnetic read head pickup 87. Undercut regions 88 and 89 are formed in the front wall 83 above and below the pickup head 87. The function of these undercut regions will be described below. Small pins 90 and 91 comprise exterior projections on side walls 82 and 81 spaced a short distance from the front wall 83. Projections 90 and 91 are provided on the axis of the magnetic pickup head 87. These projections provide a gimbal mounting arrangement which will be described below. Signal output pins 95 and 96 extend from the back wall 84 and a housing ground wire 97 is attached to top wall 85 as shown in FIG. 15.

The mounting arrangement 55 for mounting the data read head assembly 54 in read head window 59 utilizes a bracket mounting arrangement 100 which is integrally formed with the cover 52 during the injection molding process. Mounting arrangement 55 also includes a bracket arrangement 101 which holds read head assembly 54 in position in read head window 59 and includes a spring biasing arrangement which engages the read head assembly and biases the read head 87 toward the wall of the card slot 58 opposite the read head window 59.

Preferably, bracket mounting arrangement 100 comprises a pair of screw mounting posts 104 and 105 which are integrally formed with cover 52 in positions adjacent read head window 59. The structure of each of the screw mounting posts 104 and 105 is substantially the same so the details of only one portion will be described in conjunction with FIGS. 12 and 13. Screw mounting post 105 includes a base portion 106 extending from the underside 107 of cover 52. A brass screw insert 108 has a lower portion captured within base 106 as shown in FIG. 12. An arrangement of four buttresses 109 are provided, each extending from base 106 upwards alongside of the threaded insert 108.

Adjacent each of the screw mounting posts 104 and 105 is a location pin arrangement 100 and 111, each of which is integrally molded with the adjacent mounting post in the process of forming cover 52. An upper projecting portion 112 is provided on each location pin arrangement and extends above the top of screw mounting posts 104 and 105. The location pins are buttressed for stability as shown.

Bracket arrangement 101 comprises an integral spring and bracket element having an upper bracket portion 115 which is adapted to be mounted with screws on mounting posts 104 and 105. A lower bracket portion 116 forms with upper bracket portion 115 an L-shaped cross sectional bracket configuration. When the upper bracket element 115 is mounted on screw mounting posts 104 and 105 as shown in FIG. 15, the lower bracket element 116 extends substantially parallel to the side walls of card slot 58 a short distance behind the read head window 59. Lower bracket element 116 has a generally rectangular aperture 117 formed therein to receive read head assembly 54. The side-to-side dimension of aperture 117 is formed to correspond with close tolerance to the side-to-side outer dimension of the read head housing 80 to preclude any substantial lateral movement of the read head assembly in aperture 117. However, the top-to-bottom dimension of aperture 117 is made slightly larger than the top-to-bottom dimension of read head housing 80 to permit read head housing 80 to rotate slightly about the axis defined by projecting pins 90 and 91.

The dimensions of the upper bracket element 115 and lower bracket element 116 are selected relative to the position of the mounting posts 104 and 105 such that the bracket element 101 automatically provides a spring biasing force against the projections 90 and 91, which urges the front face 83 of the read head assembly 54 toward the right side wall 120 of card slot 58, as shown in FIG. 15. Preferably, when no credit card is being wiped across the front of the read head assembly, the spring pressure from lower element 116 urges the front face 83 of the read head assembly into slight pressure contact with the right hand wall 120 of the card slot. This prevents chattering of the read head assembly when no card is being wiped past it in the card slot 58. A slight amount of chatter would not be detrimental to the operation of the read head assembly, but may give a false impression of something loosely rattling in the terminal.

Bracket element 101 is preferably formed from a sheet of stainless steel having a thickness of about 0.2 millimeters. The characteristics of the material used are selected so that the lower element 116 provides inherent spring pressure which keeps the read head 87 against the magnetic stripe on a credit card being wiped past the read head assembly.

Apertures 122 and 123 formed in the upper bracket member 115 cooperate with the threaded internal aperture 124 in each of the brass inserts 108 on mounting posts 104 and 105 to receive a mounting screw 125. Apertures 126 and 127 in upper bracket member 115 cooperate with location posts 112 to position the upper bracket element 115 accurately.

It will be appreciated that a simple assembly operation is required to mount the read head bracket 101 and read head assembly 54 to the cover 52. Read head assembly 54 is inserted in the aperture 117 in bracket member 116, backwall first, and is manually held in position while the upper bracket element 115 is placed in position on the screw mounting posts 104 and 105 with the location posts 112 guiding the upper bracket element 115 into position. Screws 125 are then inserted to permanently mount the bracket arrangement 101 on the mounting posts 104 and 105.

This simple, low cost mounting arrangement is a substantial contributor to the overall low part cost and assembly cost of the terminal 50 depicted in FIGS. 9 and 10. The assembly operation of the other elements of the terminal, including the two circuit boards 56 and 57, have been described above. It should be understood that the entire mounting arrangement for the read head, including the spring biasing bracket arrangement could also be injection molded with the cover of the case.

Referring to FIGS. 15 and 16, it should be apparent that the read head assembly 54 is effectively gimbal mounted around the axis defined by the projections 90 and 91 thereon. The undercut regions 88 and 89 on the front face 83 of the read head housing 80 cooperate with this gimbal mounting arrangement to ensure that the read head pickup 87 will maintain contact with the magnetic data stripe on the credit card being wiped past the read head assembly in the card slot 58, even if a localized warping of the card is present in the region being wiped by the read head. This ensures reliability of detecting the magnetically encoded data pattern on the credit card track.

The particular terminal 50 depicted in the drawings and described thus far comprises a single track reading system for reading track two on a credit card. Track two contains the card number and a few bits of other information such as card expiration date. It should be apparent that the system of this invention could readily be extended to a multiple read head arrangement for reading other tracks on the credit card.

The position of the magnetic pickup head 87 on the front face of read head assembly 54 must be quite accurately controlled relative to the bottom wall 129 of card slot 58 to achieve good signal pickup levels and a good signal-to-noise ratio. It has been found that dimensional tolerances on the positioning of the mounting aperture 117 in the bracket member 101, together with sufficiently accurate dimensional tolerances on the formation of the screw mounting posts 104 and 105 for the bracket element 101, can be achieved by careful attention to forming the male and female mold elements in the injection molding process.

Referring to FIG. 17, an alternative version of an integral bracket and spring mounting means is disclosed. In this embodiment the bracket arrangement comprises a first bracket element 130 which has a shape similar to the integral spring and bracket element depicted in FIGS. 14 and 15, but the aperture therein simply holds the read head assembly 54A in vertical and horizontal position without applying any spring biasing force thereto. The axial projections 90 and 91 which are present on the read head assembly 54, depicted in FIGS. 14 and 16 are not provided on read head assembly 54A. Instead, a second bracket member 131 provides the spring biasing pressure at point 133, applied through a bracket member 132 to the backwall of the housing of read head assembly 54A.

Read head assembly 54A has a gimbal mounting arrangement within the read head window 59, due to the slight oversized vertical dimension of the aperture in bracket element 130. However, the gimballing action in this case is essentially controlled by the contact points 133 at the back of the case.

Figure 18:
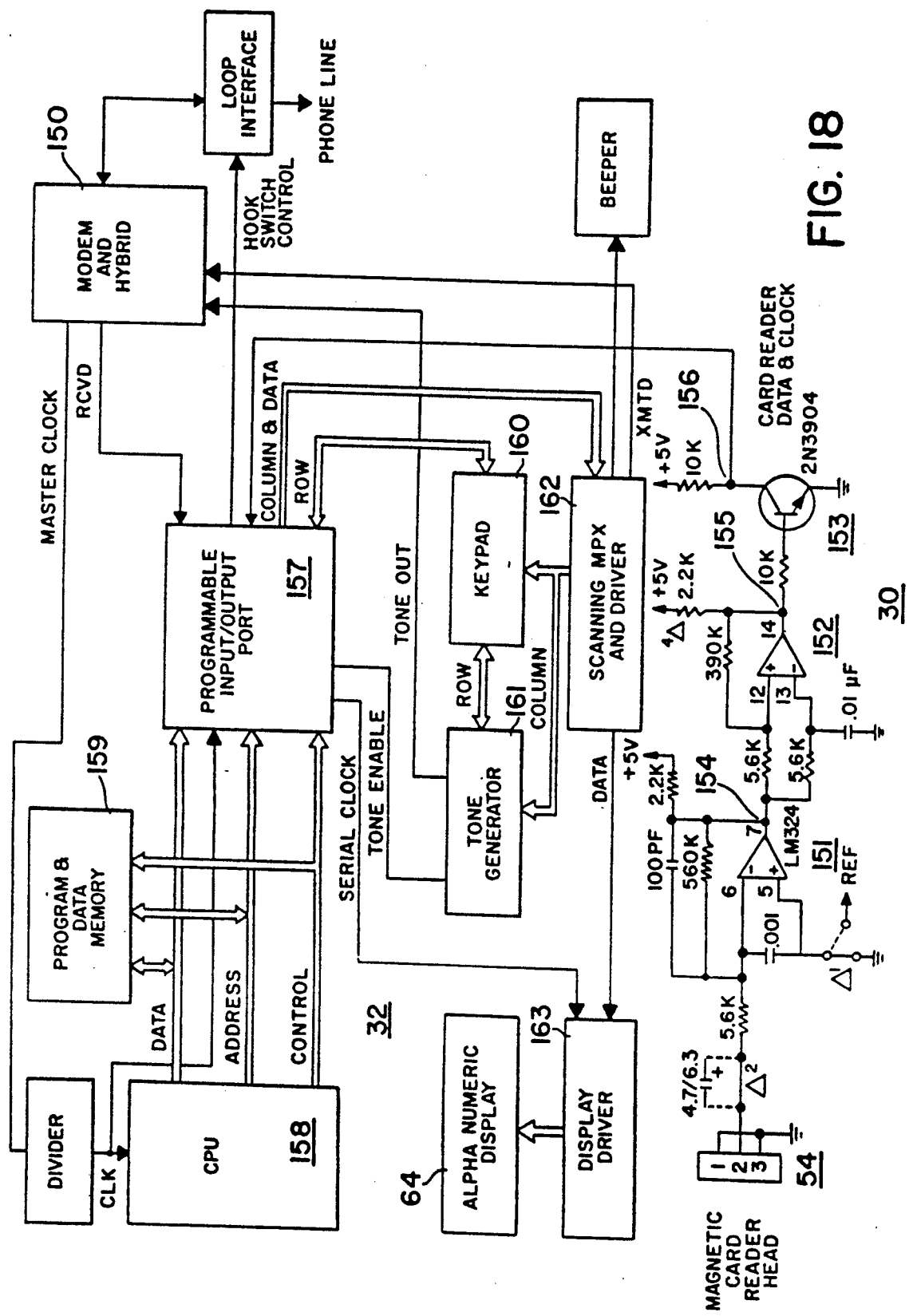
FIG. 18 is a schematic diagram of electronic circuitry for a card reader terminal incorporating features of this invention.

FIG. 18 is partially a circuit schematic diagram and partially a block diagram of the one embodiment of the electronics and software system portion of this invention. The basic elements as described above in conjunction with FIG. 6 are card reader head assembly 54, signal conditioning circuits 30, and microcomputer circuits 32, together with modem and analog signal drive circuit 150. Signal conditioning circuit 30 will be discussed first.

Signal conditioning circuit 30 includes a high gain amplifier 151 followed by a voltage comparator circuit 152 and a level shifter circuit 153 which makes the output of the voltage comparator 152 compatible with TTL logic. To understand the operation of the signal conditioning circuitry, it will be understood that the desired end result is to recreate the square wave data signal used to write data on the magnetic stripe on the back of the credit card. The card account number, expiration date, and other information are written on track 2 of the magnetic stripe as a serial digital bit stream. The encoding technique used is two frequency coherent phase encoding, also referred to as F2F encoding.

Figure 19:
FIGS. 19-22 are waveform diagrams useful in explaining the operation of features of this invention.

FIG. 19 depicts the voltage waveform used to drive the write head employed in the recording of the information onto the magnetic track. The voltage transition of this square wave signal from one level to the other causes the direction of the magnetic field of the write head and therefore the direction of the magnetization of the particles on the data stripe to reverse. This is known as flux reversal writing. There are twice as many voltage transitions for a logic ONE as there are for a logic ZERO value. For a track encoded entirely with logic ONES there are 150 flux reversals per inch. For a nominal card swipe of ten inches per second average speed, there will be 750 to 1500 flux reversals per second. On an oscilloscope these reversals will occur between about 667 and 1,333 microseconds apart.

Other aspects of the standard magnetic stripe encoding for track 2 on credit cards will be found in the American National Standard magnetic stripe encoding specification X4.16-1983 which is hereby incorporated by reference. That standard is available from the American National Standards Institute, Inc., 1430 Broadway, New York, N.Y. 10018.

Figure 20:

In the data decoding process, the systems and software of this invention treat the data as inverted logic so the two flux reversals within a clock interval are considered a binary zero and a single flux reversal is considered a binary one. FIG. 20 illustrates the voltage waveform at the output of the magnetic head pickup of the card reader. Amplifier 151 amplifies the very small output signal from the magnetic head by a gain factor of about 100. At the output terminal 154, the amplified wave form will have a peak amplitude of four volts for a nominal card swipe speed.

Figure 21:

Voltage comparator 152 is designed to have a hysteresis of about 30 millivolts. The output wave form at node 154 is compared with a delayed version of the wave form provided in the RC delay circuit of R24 and C41 with a delay of about 56 microseconds. The net result of this comparison is that the output of the comparator circuit at terminal 155 changes state whenever the input signal shown in FIG. 20 changes direction at the peak. The output at 155 is shown in FIG. 21 as a substantially square wave signal which effectively recreates the original F2F encoded wave form.

Level shifter 153 is an NPN transistor stage which produces output signals which are TTL compatible. The card reader data output on terminal 156 is coupled to a programmable input/output (PIO) port 157 in the microcomputer section 132. In accordance with this invention, the time intervals between transitions of the square wave signal shown in FIG. 21 are measured and stored using a software polling loop in real time as a card is swiped past the magnetic read head. Thereafter the stored timing values are decoded into binary data bit values in a post processing interval. These binary data bit values are stored and utilized in a software routine to reconstruct the original card data bytes. The software process for accomplishing this will be described below.

Microcomputer section 32 comprises in most respects standard microcomputer circuit components with data communication and control through a programmable input/output port 157 functioning under control of central processing unit 158 in accordance with the program instructions stored in program and data memory 159.

Program and data memory 159 preferably comprises a programmable ROM section storing the control programs which cause the microcomputer to perform the real time polling routine followed by post processing decoding of the stored timing information from the signal conditioning circuits. It also includes a CMOS RAM section with battery backup circuits (not shown). The program ROM also stores other control program routines utilized in the credit verification terminal. None of these other routines is involved in this invention and will not be discussed here.

Keypad 160 together with tone generator 161 and scanning multiplexer and driver 162 provide a cost effective approach to two-way data communication into and out of the microcomputer, including computer control of generation of dial tones in tone generator 161, manual input of alphanumeric information from keypad 160 and serial data communication to display driver 163 and to modem and hybrid circuit 151 through the scanning multiplexer and driver 162. Keypad 160 and scanning multiplexer 162 combine to provide row and column drive to the tone generator 161 for computer controlled operation of dialing tones to be coupled out on the phone line for autodialing purposes. The cost conserving circuit design approach depicted in FIG. 18 complements the cost effective design of the case and the magnetic readhead mounting arrangement. Together they provide very sophisticated features and highly reliable operation of a credit verification terminal with low manufacturing costs due to both a low parts cost and a low assembly cost.

Figure 22:
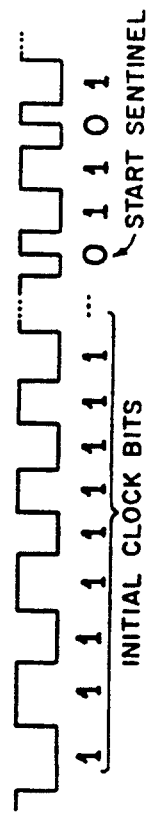

FIG. 22 illustrates portions of the sample data wave form produced at the output of signal conditioning circuit 30, including illustrating that the initial clock bits on the card have bit value of ONE and the start signal is the first ZERO bit encountered on the card. The data encoded on the card is five bit logic, which is converted and has the least significant bit first. This is pertinent to the decoding scheme which is done during postprocessing and does not affect the initial real time polling to determine bit values. FIG. 22 also shows that the frequency may change substantially during the card swipe, since it is dependent on the instantaneous velocity of the card passing the read head and manual swiping of the card will not produce a constant velocity. As will be seen from the software routine described below in the postprocessing routine, the clock value is reconstructed during the data decoding process so that accurate determination of bit values can be achieved.

Figure 23:
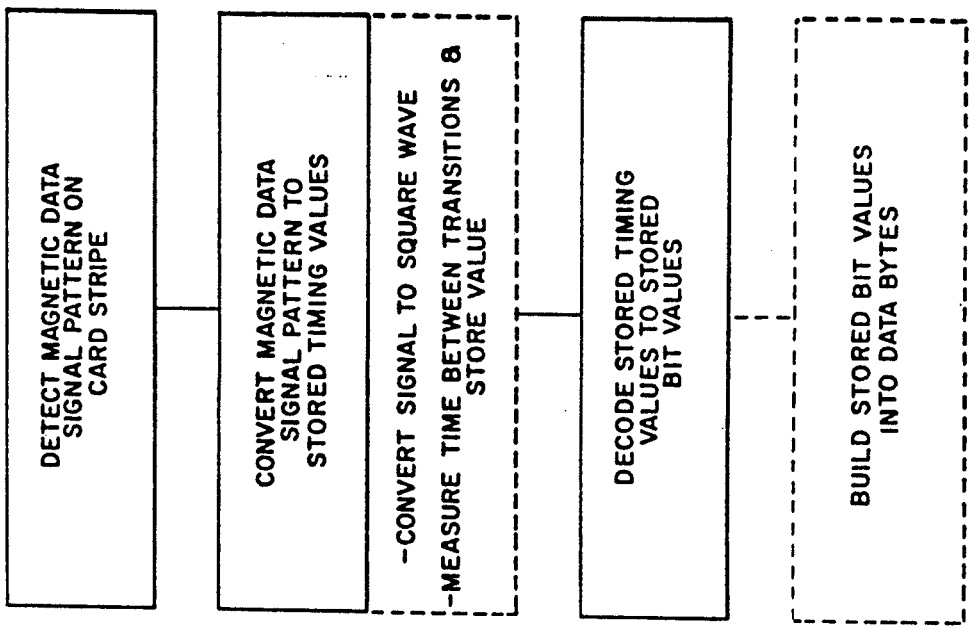
FIGS. 23-26 are process flow diagrams illustrating features of this invention.

FIG. 23 illustrates the basic flow of the magnetic data reading process of this invention. As shown in the flow chart of FIG. 23, the process involves reading the magnetic flux reversals on the magnetic data track followed by converting the detected data signal pattern in real time to a sequence of stored timing values representing the data signal pattern. Thereafter, the process involves decoding the sequence of stored timing values into a sequence of stored binary data values based on the pattern of stored timing values.

The converting process step preferably includes converting the detected signal pattern in terms of flux reversals into square wave signal having an integral clock and wherein the ONE bit value is defined by a single transition of the square wave signal during a clock interval and a ZERO bit value is defined by two transitions of the square wave signal during the clock interval. This is followed by measuring in real time the time interval between each signal transition of the square wave signal and then storing in real time a data value representing each of the time intervals as they are measured.

The step of converting to a square wave signal is performed in the signal conditioning circuit 30 depicted in FIG. 18. The measuring and storing steps are performed in a software polling routine which will be described in detail below.

The basic decoding steps shown in FIG. 23 as the last step of the process may, in some instances simply involve decoding a sequence of binary data values and outputting those via a communication channel. However, in a credit verification terminal, it is desirable to decode into the data bytes originally stored on the card. The general method of accomplishing this involves building the binary data values as they are converted into multiple digit bytes of data based on the known data pattern, storing these bytes as they are built, and then finally decoding the stored bytes into the actual card data bytes based on prearranged software algorithms according to the standard data format. It should be understood that an alternative approach would be to convert and store all of the data bit values and then postprocess into data bytes and card bytes. There are many ways of handling the binary data from the card once it has been recovered.

The improvement provided by this invention is to do the recovery of binary data values in a software routine, using microprocessor and memory already in the system, rather than go to the expense of providing dedicated data decoding circuitry.

Figure 24:
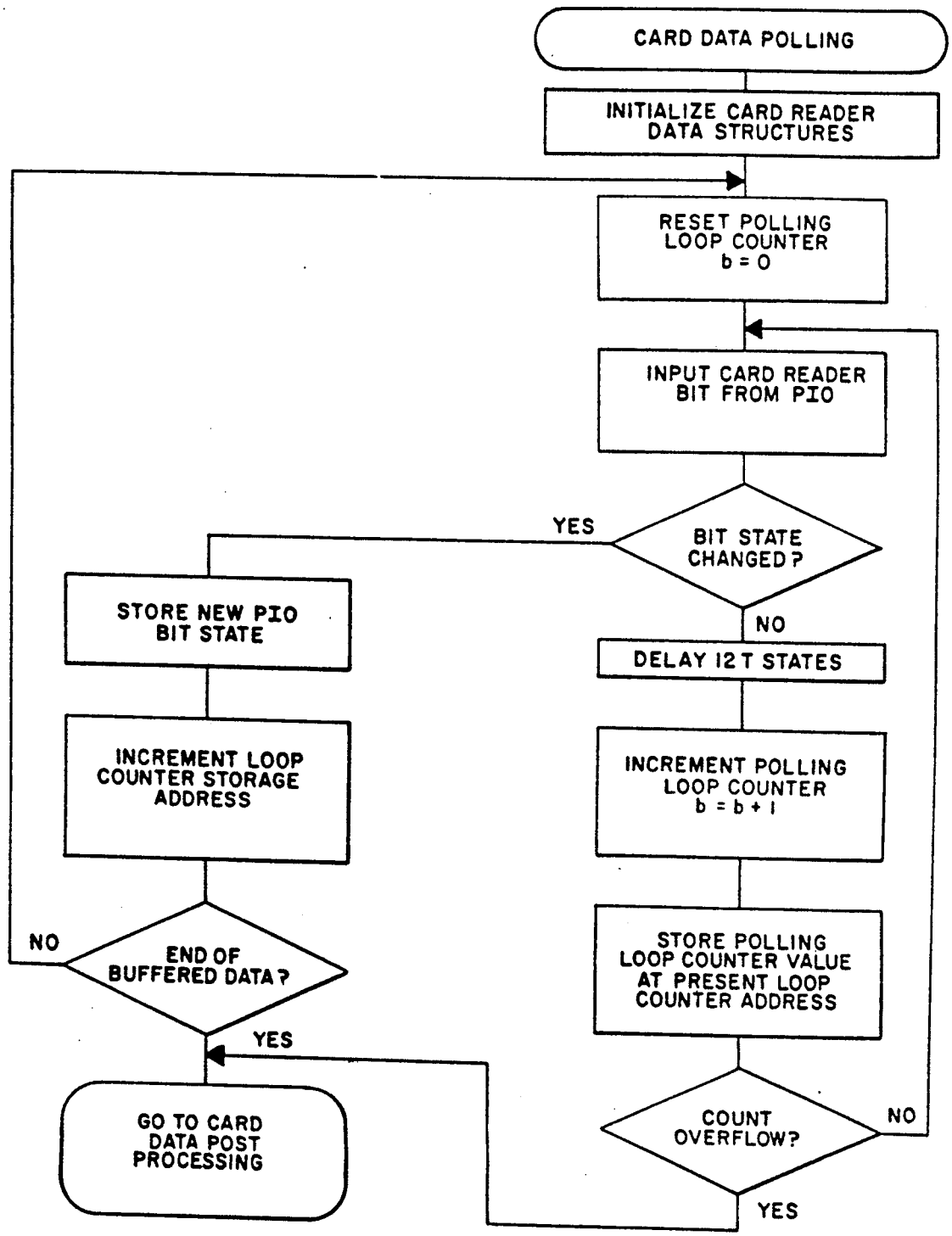

FIG. 24 illustrates the software routine for card data polling. This routine performs the task of determining when transitions of the square wave signal occur and measuring and storing the time interval between such detected data transitions in real time. This is accomplished using a software polling loop having a prearranged constant execution time between polls. This execution time is short enough that a substantial number of passes through the polling loop is executed even when the credit card is moving at the fastest anticipated speed.

The speed of manual wiping of the card is expected to be between about four and sixty inches per second. This corresponds to a range of bit rates of 300 bps and 4500 bps. At 300 bps there are about 3.3 milliseconds to resolve in the bit to bit time interval. At 4500 bps there are only about 0.22 milliseconds to resolve in the bit to bit interval. Accordingly, it has been determined preferable to use an inner polling loop of less than seventy T-states which corresponds to about thirty five microseconds at a clock speed of about two megahertz. At the fastest anticipated card wiping speed, at least about seven polls will be completed between signal transitions. Nominal card speed of about ten inches per second will produce about forty-six polls between signal transitions of a zero bit.

The card data polling routine depicted in FIG. 24 begins with initialization of the card reader data structures. The next step is to reset the polling loop counter (i.e. setting to zero value). Next the card reader bit value is input from the PIO 157 (FIG. 18). The software then determines whether the bit state has changed from the last time the polling loop was executed. This is done in a simple software compare routine or XOR function. If the bit state has not changed, the internal polling loop is entered.

This internal polling loop involves the steps of executing delay code for a prearranged number of T-states (to equalize execution times in the two loops), incrementing the value of the polling loop counter and then storing the loop counter value at the currently active memory address. If there is no count overflow (produced by the card stopping in the wiping process, for example), the polling loop returns to the entry point and inputs the card reader bit value again and tests for a state change.

When a state change is detected, the program branches to the steps of storing the new bit state detected as the current state and incrementing the loop counter memory storage address to the next location. This is followed by a test for the end of buffered data. If the end is not encountered, the program loops back to reset the polling loop counter for starting the next polling cycle to measure the interval to the next change in bit state in terms of polling loop counts.

Typically about 350 timing interval bytes will be stored during the real time polling of the card data. Provision is made in the software for storing up to 512 timing interval bytes, overwriting other non-critical data elements if necessary.

Figure 25:
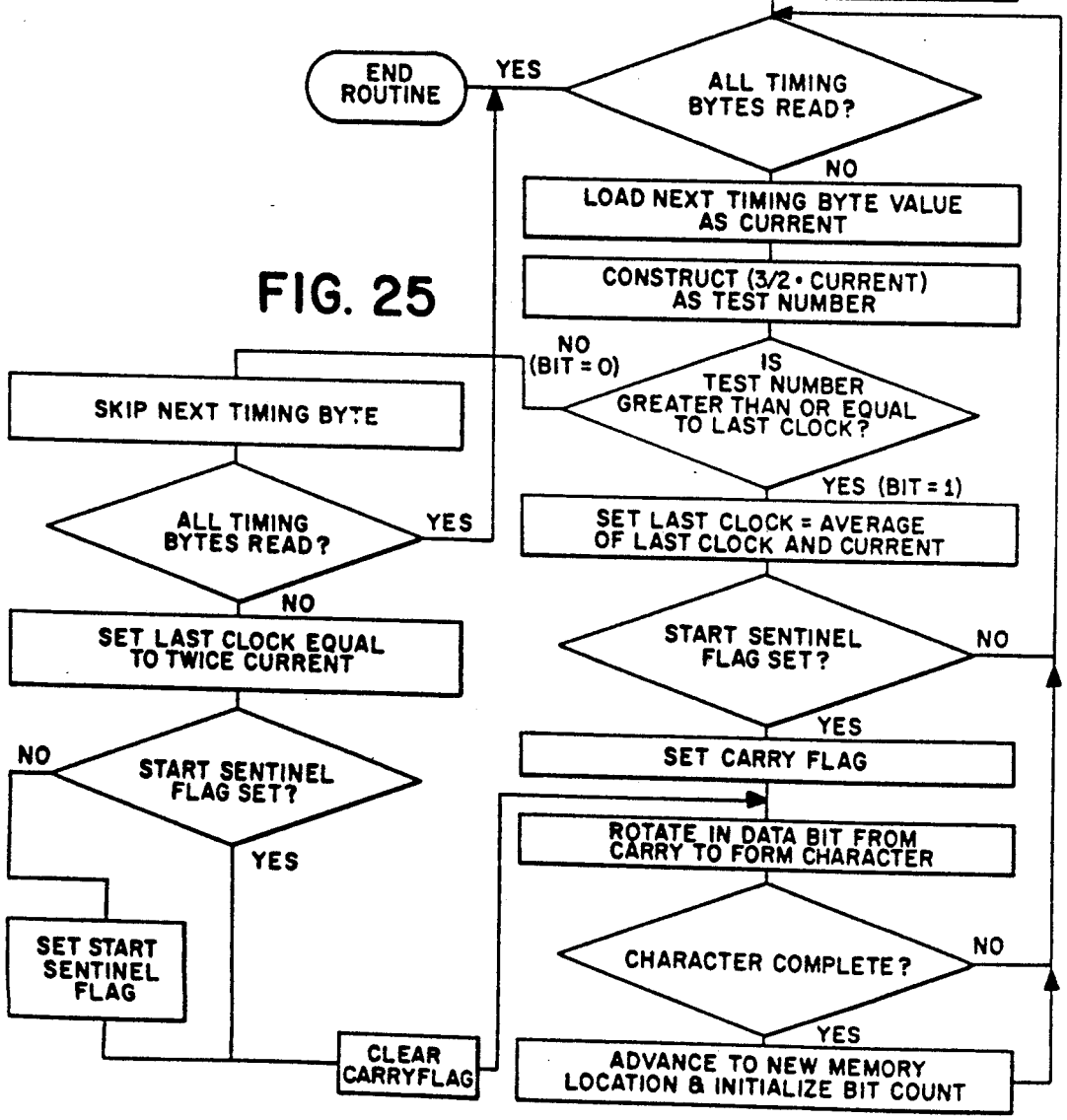

When the end of buffered data is encountered, the software program execution jumps to card data post processing routines, the first of which is depicted in FIG. 25. The post processing routine depicted in FIG. 25 performs the tasks of decoding the timing byte values into corresponding binary digit values and building multi-bit characters in the form of eight bit data bytes, five of which come from the decoded data and the other three being fill bits. Only actual card data bits are used. The initial clock bits which precede the start sentinel, i.e. the first zero bit in the decoded stream, are discarded.

The first part of the routine depicted in FIG. 25 skips past unreliable timing byte values and then stores the fifth timing byte value as the LAST CLOCK value. A check for too few samples is made to determine whether valid data may be present. If there are too few samples, e.g. no more than those which have been skipped, then an error code is set and the program exits back to the main control program.

If there are enough samples to go on with execution of this routine, the card reader variable are set up. This includes initializing the bit value in the current memory location. Memory locations used for timing byte values are overwritten since there are a substantial number of clock bit values which are ignored before real data is encountered and there is no need to save the timing byte values once they have been converted.

The routine next tests whether all timing bytes stored have been read. This test will produce an exit to the end routine only at the end of the decoding of the timing bytes previously stored. During decoding, the routine will continue on to load the next timing byte value as the CURRENT byte. The program then constructs a test number having a value of 3/2*CURRENT. Next the test number value is compared with the LAST CLOCK value and a ONE bit is declared if the TEST NUMBER is greater than or equal to the LAST CLOCK. Otherwise the value ZERO for the decoded data bit is declared.

If ZERO is declared, the next timing byte is skipped over since it is redundant, i.e. there are two timing bytes for each ZERO bit value due to the encoding scheme as discussed above. The routine next tests to see if all timing bytes have been read and exits to the end routine if the test is positive. If there are more timing bytes to decode, the LAST CLOCK value is set to twice CURRENT. This updates the LAST CLOCK value based on card speed during the timing interval associated with that bit.

The program then determines whether the start sentinel flag was previously set. If it wasn't, this is the first ZERO, indicating the start sentinel byte, and the start sentinel flag is set. Regardless, carry is cleared and the program rotates the ZERO bit from carry into the stored character. If the character is complete, the routine advances to a new memory location for the next byte, initializes the bit count at that location, and then goes back to process more timing bytes if there are any.

If the compare of TEST NUMBER and LAST CLOCK produces a yes, the bit ONE is declared and LAST CLOCK is set to the average of LAST CLOCK and CURRENT. This also updates the LAST CLOCK value based on current clock timing and accounts for card acceleration or deceleration. If the start sentinel flag set test returns NO, then the declared bit is ignored and the next timing byte examined. If the start sentinel flag has previously been set, the carry flag is set, the ONE bit value from carry is rotated into the data word at the current memory location and the following program steps already described above are executed.

Considered more generally, the algorithm used to decode the stored timing values involves converting the stored timing data value into a TEST NUMBER value by adding a preselected fraction of the stored value to itself. The use of ½ as the preselected fraction is the preferred value in view of the encoding scheme because it will produce the most accurate decoding especially at high card speed when fewer polling intervals are stored and the LAST CLOCK and TEST NUMBER have the largest possibility of error. Other values close to ½ would also produce good results and are encompassed within the principles of this invention.

Figure 26:
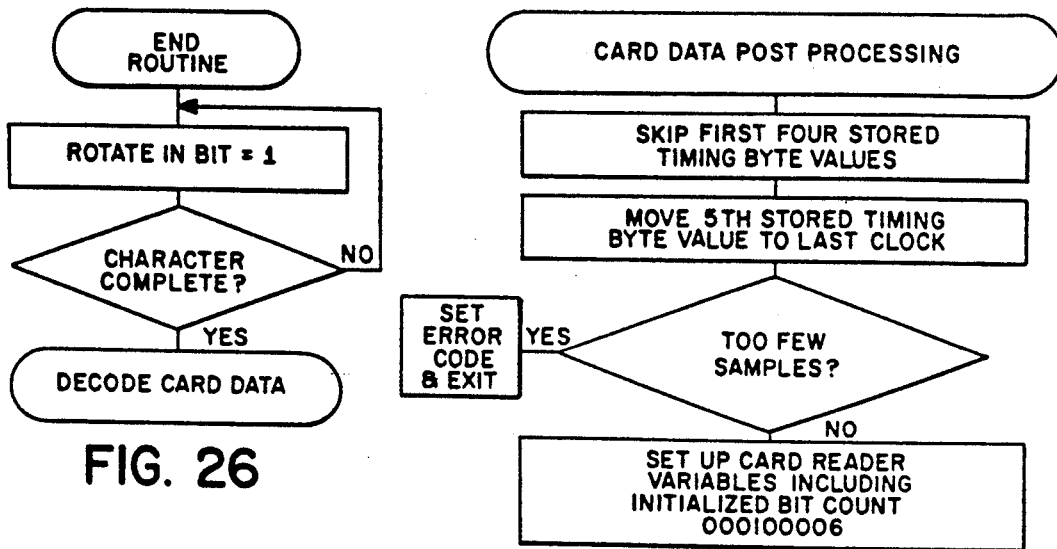

When the ALL TIMING BYTES READ? test produces a YES result, the program executes an END routine depicted in FIG. 26. This routine rotates ONE value bits into the last character until the character is complete, and then it jumps to a DECODE CARD DATA routine which is not considered a part of this invention. The structure of the card data is well known and software routines to do final decoding can readily be authored by artisans in the software field.

FIGS. 27-31 illustrate a method in accordance with this invention for injection molding a card reader case with an integrally molded card slot. As illustrated in FIG. 27 one step of the method involves forming a female mold section 180 which defines the outer front and side wall configuration of the case 52. Female mold section 180 includes a knife blade element 181 extending from one end wall to the other and partially through the mold section to define the outer bottom and side walls of the card slot. The blade includes upper and lower sections 182 and 183 which have an angled card lead-in configuration.

The central section 184 is thin, preferably about 1.5 millimeters at the bottom portion 184A and tapering down to about 1.30 millimeters at the top portion 184B. Top portion 184B, which defines the bottom of the physical card slot in the case, also has a small cutback portion on the right side to further narrow the bottom of the card slot in the region of the read head window. This forces the bottom portion of the credit card against the right hand side wall of the card slot when it is swiped past this location. The purpose of this is to ensure that the card is standing straight up in the slot as it is swiped past the magnetic read head and give good data reading sensitivity.

Another step of the injection molding method of this invention involves forming a male mold section 190 which has one portion defining the inner front and side wall configurations of the case such as portions 195 and 196 and a second portion 191 defining inner side and bottom walls of the card slot. This second portion includes a plurality of narrow buttress sections 193 regularly spaced from one end of the card slot to the other on opposite sides. These buttress sections are adapted to contact opposite edges of the knife blade in the female mold section when the two mold sections are mated together.

The process of this invention includes the steps of bringing the two mold sections together in mating relation and then injecting plastic material, preferably ABS plastic, into the void regions defined by the mold sections. During the injection process the buttress portions 193 on the male mold section support the knife blade throughout a substantial portion of the height of the blade to prevent blade distortion by the pressure of the plastic being injected into that region. This is shown in FIG. 29. Preferably at least about half of the height of the knife is held by the buttress sections. Four pairs of buttress sections are shown in FIG. 28 and in FIGS. 10 and 11 showing the physical configuration of the case. It has been found preferable to use a larger number of such buttress sections, e.g. up to eight opposing pairs spaced at fourteen millimeter intervals and having two different heights.

After the male and female mold sections have been separated and the molded case is ejected from the mold, it is preferable to place a knife-shaped insert 200 shown in FIG. 30 into the card slot while the case is completely cured in air to preclude distortion of the card slot. Without this insert, the slot configuration tends to distort during final curing due to differential curing rates at different regions.

The system and method of this invention enables the integral molded card slot to be formed within about fifteen millimeters of the right hand edge of the case and the read head to be mounted to the left of the card slot. The overall case may be made as small as 140×152 millimeters with a thickness, including cover and base of about 36 millimeters. The case size is dictated by the circuitry and other components to be housed within the case. The main contribution of this invention is to replace a space consuming, expensive dedicated card reader module with a more simple construction that is easier and less costly to manufacture.

The lower cost of a credit verification terminal designed and constructed in accordance with this invention has already proven an important contributor to acceptance of the credit verification technology by more retail establishments throughout the country.

It should be apparent that the above detailed description of specific embodiments of various features of the system and method of this invention is given by way of example only. Numerous modifications to specific features could be made by persons skilled in the art without departing from the principles of this invention as claimed in the following claims.

What is claimed is:

1. In a system for reading a data record on a data card,
   a case including a card guide slot and a read head assembly mounted adjacent said card guide slot for reading said data record on said data card;
   first circuit means coupled to said read head assembly for detecting data signals on said data record on a data card passing through said card guide slot and converting said data signals to a substantially square wave signal pattern representing binary signal data in the form of the timing pattern of positive and negative signal transitions of said square wave signal;
   microcomputer circuit means coupled to said first circuit means and including means means operative during a real time period for detecting each of said positive and negative signal transitions in said square wave signal pattern, means operative during said real time period for registering in a plurality of individual memory locations the time interval between each successive one of said positive and negative signal transitions for all of said binary signal data in said square wave signal pattern, and means operative during a post processing time period following said real time period for analyzing the pattern of said registered time intervals stored in said individual memory locations to reconstruct said binary signal data.

2. The system of claim 1, wherein one of said binary signal values comprises two signal transitions within a clock interval and the other of said binary signal values comprises a single signal transition within a clock interval; and said means for registering comprises means for polling said square wave signal at polling intervals of a length prearranged such that a substantial number of polling intervals will occur between successive ones of said positive and negative signal transitions at the fastest expected card speed through said card guide slot, and means for registering in a separate memory location the number of polling intervals occurring between each of said successive signal transitions, and said means for analyzing reconstructs the data bit value pattern from said registered number of polling intervals.

3. A method for reading and decoding data from a magnetic data stripe on a data card comprising the steps of:
   detecting the magnetic data signal pattern stored on said magnetic data stripe;
   converting, during a real time period, said detected data signal pattern to a sequence of stored timing values representing the entire magnetic data signal pattern stored on said magnetic data stripe; and
   decoding, during a post processing time period following said real time period, said sequence of stored timing value values into a sequence of stored binary digit values based on the pattern of said stored timing values.

4. The method of claim 3, wherein said step of converting includes the steps of:
   converting said detected signal pattern into a square wave signal having an integral clock and wherein a ONE bit value is defined by a single transition of said square wave signal during a clock interval and a ZERO bit value is defined by two transitions of said square wave signal during a clock interval;
   measuring in real time the time interval between each signal transition of said square wave signal; and
   storing in real time a data value representing each of said time intervals as they are measured.

5. The method of claim 4, wherein said step of decoding includes the steps of:
   (a) determining a clock period value from said stored data values;
   (b) converting a stored data value into a test number value comprising said stored data value plus a preselected fraction of said stored data value;
   (c) comparing said test number value with said clock period value to decode said associated stored data value to a ONE bit if said test number value is greater than said clock period value or a ZERO bit if said test number value is not greater than said clock period value;
   (d) storing said decoded bit value;
   (e) repeating steps (b) through (d) for the next stored data value if said decoded bit value is ONE; and
   (f) skipping steps (b) through (d) for the next stored data value if said decoded bit value is ZERO.

6. The method of claim 5, wherein step (a) is repeated each time said steps (b) through (d) are performed to update said clock period value based on a prearranged algorithm which includes said stored data value.

7. A method of constructing a point of sale credit card verification terminal including a credit card reader feature, said method including the steps of:
   injection molding a plastic case with an integral card slot having full side and bottom wall portions and a read head window in one side wall of said slot;
   mounting a magnetic read head assembly in said read head window with a magnetic pickup head positioned to read a magnetic data stripe on a credit card manually swiped through said card slot;
   coupling said magnetic read head assembly to a conditioning circuit designed to convert the output of said read head assembly to a square wave signal when a credit card stripe is swiped past said magnetic pickup head;

coupling the output of said conditioning circuit to a microcomputer having a program memory circuit and a data memory circuit; and programming said microcomputer by way of said program memory circuit to operate during a real time signal conversion and storage period both to convert all portions of said square wave signal from said conditioning circuit to a series of timing values representing binary data bits and to store each of said timing values in said series of timing values in a separate memory location in said data memory circuit and to operate during a postprocessing period following said real time signal conversion and storage period to reconstruct the sequence of binary data bits on said card stripe from the pattern of said timing values stored in said data memory circuit.

* * * * *